United States Patent [19]

Obee et al.

[11] Patent Number: 5,030,423
[45] Date of Patent: Jul. 9, 1991

[54] INTEGRATED AIR CONDITIONING SYSTEM

[75] Inventors: Timothy N. Obee, South Windsor; Gorken Melikian, Somers, both of Conn.

[73] Assignee: Carrier Corporation, Syracuse, N.Y.

[21] Appl. No.: 392,794

[22] Filed: Aug. 11, 1989

[51] Int. Cl.$^5$ .......................... A62B 7/08; A61L 9/00; B01B 47/00; F24F 3/16
[52] U.S. Cl. ........................................ 422/122; 55/316; 62/78; 62/85; 62/91; 422/4; 422/125; 423/210; 423/245.1
[58] Field of Search ...................... 423/210, 579, 245.1; 422/4, 122, 125; 55/76, 98, 316; 62/78, 85, 91; 501/417

[56] References Cited

U.S. PATENT DOCUMENTS

| | | |
|---|---|---|
| 3,925,021 | 12/1975 | Yoshino et al. ...................... 55/524 |
| 4,296,166 | 10/1981 | Ogino ................................... 55/524 |
| 4,344,775 | 8/1982 | Klein .................................... 55/524 |
| 4,680,040 | 7/1987 | Gooray et al. ........................ 55/524 |

OTHER PUBLICATIONS

Ko et al., A University Clean Room, *SCP & Solid State Technology*, Jan. 1966.

Primary Examiner—Gregory A. Heller

[57] ABSTRACT

A configuration for enhancing the performance of air pollution removal integrated air conditioning systems for airstreams having low level gaseous contaminants. The configuration includes a first filter comprising activated carbon for adsorbing gaseous contaminants, wherein adsorption is degraded by the presence of moisture, a means for increasing the moisture content of the airstream, and a second filter impregnated with chemical reagents for removal of gaseous contaminants, such gaseous contaminants reacting with the reagents to form noncontaminants, wherein the reaction is enhanced by the presence of moisture. The means for increasing the moisture content is positioned downstream of said first filter and upstream of said second filter. Also disclosed is a method for enhancing the performance of air pollution removal integrated air conditioning systems for airstreams having low level gaseous contaminants by utilizing the configuration of the present invention.

6 Claims, 2 Drawing Sheets

INTEGRATED AIR CONDITIONING SYSTEM

CROSS REFERENCE TO RELATED APPLICATIONS

This application is related to U.S. application serial No. R-3292 filed on even date herewith, entitled "Fine Fabric Filter Air Pollution System", the disclosure of which is incorporated by reference.

TECHNICAL FIELD

The present invention relates to a means for improving filter performance for use in active air pollution removal integrated air conditioning systems.

BACKGROUND ART

The term "air conditioning" has been broadly defined to mean the maintenance of certain aspects of the environment within a defined space. Environmental conditions, such as air temperature and motion, moisture level, and concentration of various pollutants, are generally encompassed by the term.

Comfort air conditioning refers to control of spaces inhabited by people to promote their comfort, health and productivity. Spaces in which air is conditioned for comfort include residences, offices, institutions, sports arenas, hotels, factory work areas, and so on.

With recent trends being directed to maintaining quality levels of clean air as today's society has become more health and environmentally aware, a greater emphasis is being placed on the purification components of air conditioning systems. At its simplest level, air pollution control suggests a background knowledge concerning desirable criteria for clean air, the ability to relate air quality to levels of emissions, the development of emission limits or other control standards, the means to measure such emissions and air quality, and the availability of practical techniques to reduce air pollutants. Therefore, although increasing attention as been directed to process alterations to reduce air-pollutants in general, great reliance is still placed upon physical removal processes.

A complete air conditioning system is capable of adding and removing heat and moisture. Moisture is typically added to provide an environment comfortable for human occupancy. In addition, such systems can filter dust and odorants from the space or spaces it serves. Winter air conditioning systems are designed to heat, humidify and filter for winter comfort while summer air conditioning systems cool, dehumidify and filter. Typically, design conditions are such that both winter and summer air conditioning can be maintained by multiple independent subsystems tied together by a single control.

To control humidity and air purity (and in most systems for controlling air temperature), a portion of the air in the space is withdrawn, processed, and returned to the space to mix with the remaining air. Such air-handling units generally contain a filter, a cooling coil, a heating coil, and a fan in a suitable casing.

Although the filter removes dust and other pollutants from both return and outside air, the gaseous pollutant removal efficiencies and performance of such filters are still considerably less than other low cost air purification alternatives (e.g., ventilation) because of the very low concentrations of pollutants found in areas of human occupancy. For example, low concentrations of pollutants such as formaldehyde, sulfur dioxide, and nitrogen dioxide are generally found in levels less than 100 ppb (parts per billion). As such, current filter systems are not cost effective for active indoor air quality control, i.e., human habitats, office buildings, etc. In these applications for example, the air pollution removal (APR) devices performance is limited, e.g., pollutant removal efficiency, $E_c < 50\%$ and reagent utilization (the amount of reagent used of total reagent available), $\mu_R < 10\%$. Therefore, a need exists to improve the performance of such filters while maintaining acceptable capital and operating costs. Only then will APR devices become an integral part of air conditioning systems and an economically attractive alternative in environments harboring low levels of gaseous pollutants.

DISCLOSURE OF THE INVENTION

Accordingly, it is an object of the present invention to provide a means for enhancing the performance of integrated air pollution removal/air conditioning systems.

Another objective is to remove gaseous contaminants as well as simultaneously controlling humidity within an enclosed space.

Still another objective is to provide an attractive alternative in areas of low level pollutants wherein such air pollution removal devices are typically not economically feasible.

The present invention utilizes a specific configuration to enhance the performance of air pollution removal integrated air conditioning systems for airstreams containing low levels of gaseous contaminants. More specifically, the present invention includes a first filter comprising activated carbon for adsorbing gaseous contaminants, wherein said adsorption is degraded by the presence of moisture, a means to increase the moisture level of an inlet airstream, and a second filter impregnated with chemical reagents for removal of gaseous contaminants, such gaseous contaminants reacting with said reagent to form noncontaminants, wherein said reaction is enhanced by the presence of moisture.

The configuration of the present invention is such that the means for increasing the moisture content is positioned downstream of said first filter and upstream of said second filter.

The configuration of the present invention is used to enhance the performance of air pollution removal integrated air conditioning systems for airstreams having low level gaseous contaminants. A method includes filtering the airstream through the first filter of the present invention, humidifying the filtered airstream through a means for increasing the moisture content of the filtered airstream, and filtering the filtered humidified airstream through the second filter of the present invention.

BEST MODE FOR CARRYING OUT THE INVENTION

Figure 1:
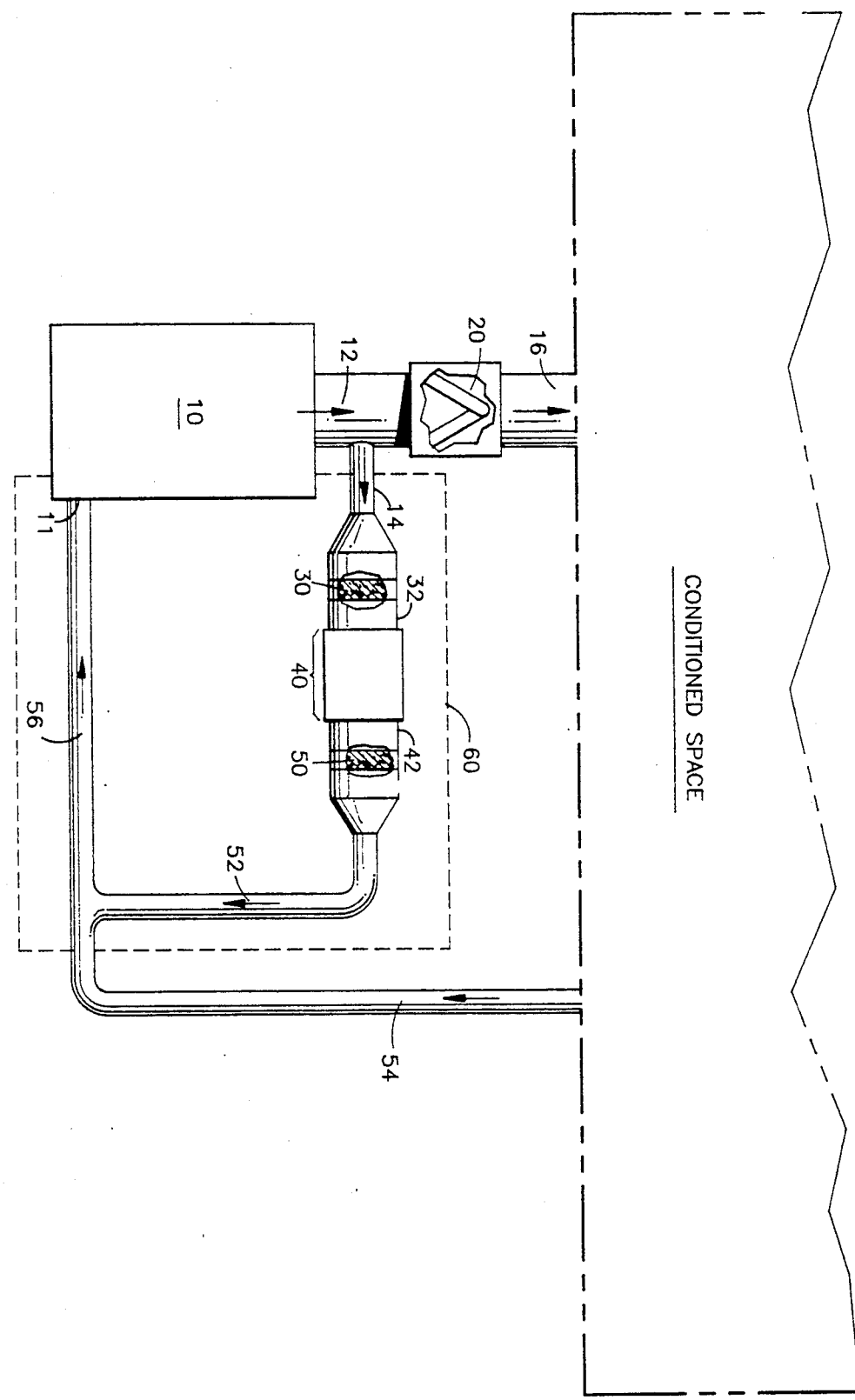
FIG. 1 is a diagrammatic representation of a serial configuration consisting of a first filter, a humidifier, and a second filter to remove low concentrations of contaminants within a ducted air installation.

The present invention includes a first filter comprising activated carbon for adsorbing gaseous contaminants, wherein said adsorption is degraded by the presence of moisture and a second filter impregnated with chemical reagents for removal of gaseous contaminants, such gaseous contaminants reacting with said reagents to form noncontaminants, wherein said reaction is enhanced by the presence of moisture. Conventional fabric filters used in air pollution removal systems can be used for both the first filter and second filter. Pellet bed filters and other sorbent (gas adsorbing substance acting as a substrate for reagent deposition/impregnation) filters serve as suitable first filters and second filters. Preferably, said first and second filters contain gas sorbing small diameter porous particles suspended by a web of fabric.

The fabric chosen to create the web preferably exhibits good tensile strength, has a low pressure drop (i.e., less resistance towards passing fluids), maintains both chemical and physical stability, and is inert/nonreactive with the particle sorbents. Non-woven fabrics made from various polymers have been shown to provide maximum chemical and physical stability. A polyester/polyvinylchloride (PVC) copolymeric web is preferable although other fabrics displaying similar characteristics are also suitable.

Preferably, the particle chosen for the sorbent should be such that a maximum amount of internal surface area exists per gram of substrate. The smallest size particles commercially available are most favorable because the distribution of small particles allows for an increase of exterior surface area (per unit volume) with a minimal decrease in fabric porosity. In addition, diffusion inward at the surfaces of large particles is much too long and, as a result, much reagent goes unused. Typically, the particle mean diameter size is about 0.1 mm to about 1.0 mm. A 0.2 mm to 0.4 mm mean diameter particle is preferable for the above-mentioned reasons.

Activated carbon is a preferable particle substrate for both the first and second filters because of its tremendous interior surface area (per gram) and its high degree of adsorption potential. Other particles possessing similar characteristics would also be suitable if commercially available.

The first filter comprising activated carbon is included to adsorb those contaminants which are effectively adsorbed without the use of a reagent. These adsorbed contaminants are typically displaced by water molecules and, as a result, adsorption is degraded by the presence of moisture. Examples of such contaminants include classes of volatile organic compounds (those compounds which vaporize or have a non zero vapor pressure at ambient temperature and pressure) such as aliphatic hydrocarbons, aromatic hydrocarbons, halogenated hydrocarbons, ethers, esters, ketones, alcohols, amines and phenols, or more specifically, toluene, benzene, methanol, etc.

The second filter contains reagent impregnated particles for removal of gaseous contaminants, such gaseous contaminants reacting with the reagent to form noncontaminants. This reaction is enhanced by the presence of moisture in situations where water is involved in the chemical reaction between the contaminant and reagent, whether in a rate limiting or intermediate step. Examples of said gaseous contaminants include aldehydes (such as formaldehyde, acetaldehyde, nonanal, decanal), gases which react with water to produce strong acids (such as nitrogen dioxide, and sulfur dioxide), and acidic gaseous contaminants including hydrogen halides (such as hydrogen chloride, hydrogen bromide and hydrogen fluoride) and carboxylic acids (such as acetic, formic and butyric acids).

The particular reagent used will depend on the gas pollutant to be removed. For example, sulfuric acid is a known reagent for the removal of ammonia. Reagent treated particles are commercially available through numerous manufacturers. For example, a $30 \times 140$ mesh (U.S.) reagent treated coconut shell activated carbon, manufactured by Barnebey & Sutcliffe (Columbus, Ohio), is effective because of its excellent quality and particle size consistency. Specific reagent treated particles available from Barnebey & Sutcliffe include Type CA, ST-1, and CI impregnated carbons for the removal of ammonia and amines, sulfur dioxide and other acid gases, and formaldehyde, respectively.

The means for increasing the moisture content of the airstream is preferably a conventional humidifier. One skilled in the art could readily accomplish said means, however, by other techniques employed or known to said art.

The first filter is positioned upstream to said means of increasing the moisture content because adsorption is degraded by the presence of water. As such, overall filter performance, as well as removal efficiency and maximum adsorption capacity of contaminants, is decreased.

It may be possible that some chemical reagents may be disrupted or degraded (i.e., experience a decrease in reagent utilization) by the introduction of moisture. In this case, reagents whose performance is also degraded by high levels of relative humidity (usually above 50%), may also impregnated onto the first filter.

The second filter is positioned downstream to said means of increasing the moisture content of the airstream. This configuration is important because the second filter's performance is significantly enhanced by the presence of moisture in situations where water is involved in the chemical reaction between the contaminant and reagent. The second filter is therefore used to remove those gaseous contaminants which, when reacted (adsorbed) with a particular reagent, has water as one of the participants in the chemical reaction process. In addition, it is believed that moisture enhances the transport mechanism within the particle. By this is meant that the rate of contaminant movement within the particle, as well as redistribution of unconsumed reagent throughout the particle increases. As such, moisture is added to an airstream at a point where its presence enhances the performance i.e., the removal efficiency of a particular reagent and ultimately, the filter itself.

The present invention also utilizes a method for enhancing the performance of air pollution removal integrated air conditioning systems for airstreams having low levels of gaseous contaminants. Specifically, the method includes filtering said airstream through a first filter comprising activated carbon for adsorbing gaseous contaminants, wherein said adsorption is degraded by the presence of moisture, humidifying said filtered airstream through a means for increasing the moisture content of said filtered airstream, and filtering said filtered humidified airstream through a second filter impregnated with chemical reagents for removal of gaseous contaminants, such gaseous contaminants reacting with said reagent to form noncontaminants, wherein said reaction is enhanced by the presence of moisture.

Preferably, the airstream containing low levels of gaseous contaminants enters the first and second filters at a predetermined velocity and is maintained within the filters for a residence time between about 0.3 seconds and about 2.0 seconds to maximize the tradeoff between removal efficiency and filter life span.

The moisture content of the inlet airstream is increased to a level such that an improvement in filter performance occurs. Preferably, the level of moisture corresponds to a relative humidity from about 40% to about 90%. Especially preferred is a relative humidity of the airstream between about 50% to about 75% because this range is within a zone comfortable and healthy to human beings.

These filter configurations may be used in a variety of air purification/air conditioning systems. Preferably, integrated HVAC (Heating Ventilation & Air Conditioning) systems provide the greatest removal efficiency and reagent utilization. FIG. 1 illustrates one embodiment for a ducted air type installation. A portion of the outlet air 12 from a furnace 10 is bypassed into an airstream 14. This bypassed airstream 14 occurs prior to an evaporator coil 20 if an air conditioner is included in the system. The airstream 14 is filtered through a first filter 30 to become a filtered airstream 32. The filtered airstream 32 is then passed through a humidifier 40 to produce a humidified filtered airstream 42. The humidified airstream 42 is then filtered through a second filter 50 to produce a filtered humidified filtered (FHF) airstream 52. The FHF airstream 52 is then returned to the furnace inlet 11 by an air-handling unit 60 which mixes the FHF airstream 52 with the remaining air 54, i.e., air from the room or conditioned space to produce a mixed airstream 56. Such mixed airstream 56 is then returned to the furnace inlet 11.

More specifically, a portion of the remaining air 54 is returned to the air-handling unit 60 and, after being conditioned (30, 40, 50), is supplied to a space 16. A portion of the outlet furnace air 12 is continuously spilled (or exhausted) to the space 16 while an equal quantity of remaining air 54 is brought into the system and mixed with the FHF airstream 52 before re-entering the air handling unit 60. This bypass arrangement is commonly used for humidifier installations.

The following example is given to illustrate the method of the present invention. It is not, however, intended to limit the generally broad scope of the present invention.

EXAMPLE

Filter X6337 available from Extraction Systems, Inc. (Norwood, Mass.) consisted of small diameter activated carbon particles suspended in a web of polyester/PVC copolymeric fabric. The filter was created using an air injected technique wherein the particles are selectively heated and thermally bonded to the fiber matrix.

The particles were coated with the chemical reagent Type ST available from Barnebey & Sutcliffe (Columbus, Ohio) for the removal of sulfur dioxide. The filter had the following design parameters: a sorbent particle mean diameter of 0.3 mm; a sorbent to fabric weight ratio of 2:1; a reagent to sorbent weight ratio of 0.2; a sorbent porosity of 60%, a filter void fraction of 0.6 to 0.8; and a filter thickness of 2.0 cm.

Figure 2:
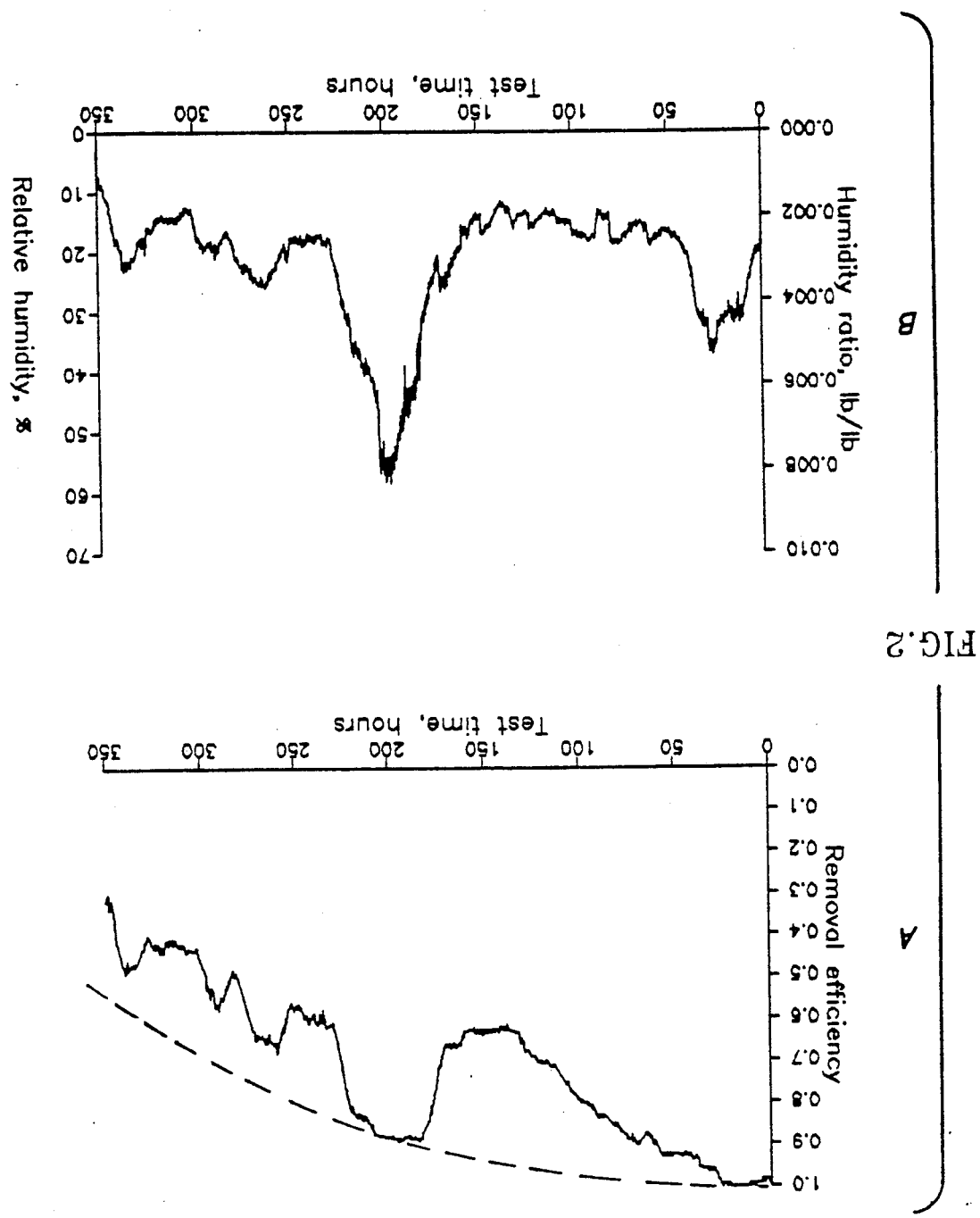
FIG. 2A is a plot of the removal efficiency of low level contaminants from an airstream by the filter configuration of present invention.
FIG. 2B is a plot of relative humidity as a function of time to illustrate the improvement of the present invention.

An inlet airstream containing 2 ppm sulfur dioxide was introduced to the above filter at a velocity of 4 cm/sec. The corresponding residence time was 0.5 seconds. As illustrated in FIGS. 2A and 2B, the filter's removal efficiency was increased by up to 50% when the relative humidity was increased from 20% to 60% at a constant temperature of 75° F. (humidity ratio of the airstream was increased from 0.003 to 0.008 lb/lb).

More specifically, FIG. 2B is a plot of relative humidity over a period of time. At approximately 150 hours, the relative humidity began to increase significantly. This trend continued up to about 200 hours. FIG. 2A illustrates an
increase in filter removal efficiency, from about 0.6 to about 0.9 during the corresponding time period.

Accordingly, a humidifier or other means for increasing the moisture level is positioned in the bypass stream downstream of the first filter and upstream to the impregnated second filter. This arrangement can provide a high, e.g., 50 to 100%, relative humidity airflow into the second filter during all seasons of the year. Winter operation provides humidity to the conditioned space as well as improving the second filter's performance.

The filters of the present invention have an improved performance from about 25% to 100% over other arrangements. In other words, these filters enjoy an increase in pollutant removal efficiency while increasing reagent utilization (in the second filter) by an amount between about 10% and 50%. Such an increase in overall performance allows these filters to successfully compete with alternate air purification methods. By taking advantage of the specific hardware arrangement in conventional air conditioning systems, only the costs of the first and second filters is added to the typical HVAC system.

Although this invention has been shown and described with respect to a preferred embodiment, it will be understood by those skilled in the art that various changes in the form and detail thereof may be made without departing from the spirit and scope of the claimed invention.

What is claimed is:

1. Apparatus for enhancing the performance of air pollution removal systems for airstreams having gaseous contaminants which comprises:
    (a) a first filter comprising activated carbon for absorbing gaseous contaminants, wherein said adsorption is degraded by the presence of moisture;
    (b) a means of increasing the moisture content of said airstream; and
    (c) a second filter impregnated with chemical reagents for removal of gaseous contaminants, such gaseous contaminants reacting with said reagents to form noncontaminants, wherein said reaction is enhanced by the presence of moisture;
wherein said means for increasing the moisture content is positioned downstream of said first filter and upstream of said second filter, and further wherein said second filter comprises gas sorbing chemical reagent impregnated porous particles suspended by a web of fibers.

2. Apparatus according to claim 1 wherein said particles are activated carbon.

3. Apparatus according to claim 2 wherein said means particle diameter is between about 0.1 mm to about 1.0 mm.

4. Apparatus according to claim 3 wherein said mean particle diameter is 0.3 mm.

5. Apparatus according to claim 1 wherein said web is a copolymeric web.

6. Apparatus according to claim 5 wherein said copolymeric web is a polyester/PVC mixture.

* * * * *